United States Patent [19]

Horne et al.

[11] Patent Number: 5,038,416
[45] Date of Patent: Aug. 13, 1991

[54] WATER CLOSET WATER SAVING DEVICE AND DISPENSER

[76] Inventors: Peggy L. Horne, 777 Morrell Ave., Burlingame, Calif. 94010; Dewey J. Lee, 951 Gull Ave., Foster City, Calif. 94404

[21] Appl. No.: 581,397

[22] Filed: Sep. 11, 1990

Related U.S. Application Data

[63] Continuation of Ser. No. 395,045, Aug. 17, 1989, abandoned.

[51] Int. Cl.⁵ .............................................. E03D 9/02
[52] U.S. Cl. ................................... 4/227; 4/228; 4/415
[58] Field of Search ............ 4/227, 228, 415, 661

[56] References Cited

U.S. PATENT DOCUMENTS

| | | | |
|---|---|---|---|
| 3,121,236 | 2/1964 | Yadro et al. | 4/228 |
| 3,715,765 | 2/1973 | Yadro | 4/228 |
| 3,934,279 | 1/1976 | Mallin | 4/228 |
| 3,943,582 | 3/1976 | Daeninckx et al. | 4/228 |
| 4,121,308 | 10/1979 | Raab | 4/415 |
| 4,186,856 | 2/1980 | Dirsking | 4/228 X |
| 4,281,421 | 8/1981 | Nyquist et al. | 4/227 X |
| 4,438,534 | 3/1984 | Keyes et al. | 4/228 |
| 4,455,692 | 6/1984 | Hegge et al. | 4/228 |
| 4,539,717 | 10/1985 | Fattori | 4/228 |
| 4,543,674 | 10/1985 | David | 4/415 |
| 4,660,231 | 4/1987 | McElfresh | 4/228 |

Primary Examiner—Henry K. Artis

[57] ABSTRACT

A passive dispenser having the capability of varying the amount of solution added to the toilets flush water such time the toilet is flushed. This variability of dosage is obtained by changing the volume of solution discharge during the flushing period of the toilet by means of sets of internal grooves, a movable baffle and specifically located fixed aperture. Said invention can help to reduce water consumption, and is equipped with its own hanger for easy installation.

6 Claims, 4 Drawing Sheets

WATER CLOSET WATER SAVING DEVICE AND DISPENSER

This application is a continuation of Ser. No. 07/395,045 filed Aug. 17, 1989 now abandoned.

FIELD OF THE INVENTION

This invention is a reusable, self priming variable dosage dispenser for products such as, toilet cleaning, water treating and disinfectants. These products come in either solid or liquid form, and are added to the toilet flush tank to form a solution. This invention provides a method to control the amount of solution being added to each flush of the toilet, and will also reduce the amount of water used in each flush of a toilet. More specifically, the present invention has no moving parts in its operation, therefore it is a passive dispenser. The variability of the dosage is obtained by changing the volume of the solution discharged during the flushing time of the toilet by means of sets of internal groves, a movable baffle and fixed apertures.

DESCRIPTION OF PRIOR ART

Dispensers to deliver a set amount of cleaning and or disinfectant are disclosed in prior patents:

In U.S. Pat. No. 4,281,421 granted to J. D. Nyquist, Aug. 4, 1981 discloses a one time usage dispenser with fixed chambers, passage ways and is designed for an improved hypochlorite cake.

In U.S. Pat. No. 4,186,856 issued to R. S. Drisking dated Feb. 5, 1980 shows a one time usage package serving as a passive dispenser which uses an air lock to isolate the additive.

U.S. Pat. No. 4,438,534 issued Mar. 27, 1981 to G. B. Keyes discloses a dispenser with three fixed chambers and path ways to dispense three pre-determined amount of additives, that works on vents and syphons and is not variable. The foregone cited inventions are one time usage packaging methods with a capability to dispense a pre-determined amount of additive and no capability to change the amount of additive or solution dispensed into the flush water. However, the cited inventions do use fixed walls for baffles to divide the device into chambers and apertures for communicating the solution in the discharge water. In addition to the one time fixed dispensers, other prior art may exist.

U.S. Pat. No. 3,934,279 issued Jan. 27, 1976 to S. Mallin, in class 4/228 where a canister is hung inside the toilet tank wall, and using water to pump the air through a liquid and to evaporate the same, through a fixed chamber, and through an aperture in a fixed baffle. The dispenser is for treatment of air around the toilet and not for treatment of the flush water.

U.S. Pat. No. 3,715,765 issued to F. G. Yardo dated Feb. 13, 1975 discloses a dispenser of perfume, as a deoderizer this dispenser also operates by the force of filling water to displace air through an open aperture at the bottom of the dispenser through a material holding liquid perfume.

U.S. Pat. No. 3,943,582 issued to J. Daeninckx dated Mar. 16, 1976 shows an enclosed holder for additive to be dispensed into the flush water. This holder is equipped with a deflector next to an aperture which can be considered as a baffle, but the unit has no capability to adjust the discharged rate.

U.S. Pat. No. 3,121,236 dated Feb. 18, 1964 issued to F. G. Yadro discloses a dispenser with four sides and a bottom to be hung inside a toilet tank, to avoid circulating currents of water and with each flush of the tank, the solution inside the dispenser is gravity feed into the tank through two apertures, where the volume of discharge is fixed to the tanks discharge and filling rate.

These cited three dispensers are reusable, use apertures, baffles and the movement of water and may have physical resemblance to our invention, but from a techinal standpoint, they have no means to vary the volume discharged.

SUMMARY OF THE INVENTION

Water used in flushing a toilet varies in chemical make-up from geographic area to area, hard water areas have a different need than a soft water area therefore a dispenser with a variable dosage is not only desirable but, may be becoming a necessity when dealing with the environmental chemical impact.

This invention a reusable, self priming variable dosage dispenser for products such as toilet cleaning, water treatment and disinfectants. The invention has no moving parts during operation, therefore it is a Passive Dispenser. The ability to vary the dosage discharged is obtained by means of sets of internal grooves, a movable baffle to fit the grooves and specifically located apertures.

The objective of this invention is to reduce the amount of additive used, save water, and can be installed without adjustment to the water closet's existing configuration.

To obtain the stated objectives, the unit is designed to be small, made of non-porous polyethylene, or similar type material, equipped with its own hanger and internally adjustable to vary the amount of solution discharged. If more then one unit is installed the amount of water saved is grater, but only one needs to contain a chemical agent.

When a tank type toilet is flushed, the tank will release water on the average of about eight seconds. When the water has reached a point where it can no longer support the discharge valve, it is dropped by gravity shutting off the discharge while the inlet valve continues to fill the tank. Filling the water closet tank can take anywhere from 20 seconds to two minutes. This variance is due to water pressure and size of the inlet valve. Although one cycle of the water closet may take more than a minute, its the first 25 seconds or so that this invention is designed to work. A more specific disclosure of objects and advantages of this invention is presented in the detailed description and drawings.

DESCRIPTION OF THE PREFERRED EMBODIMENT

The invention is a variable dosage dispenser made of polyethylene or similar type material. This invention provides a method to control the amount of solution being added to each flush. The device is also constructed to reduce the amount of water used in flushing of a tank type toilet.

Figure 1:
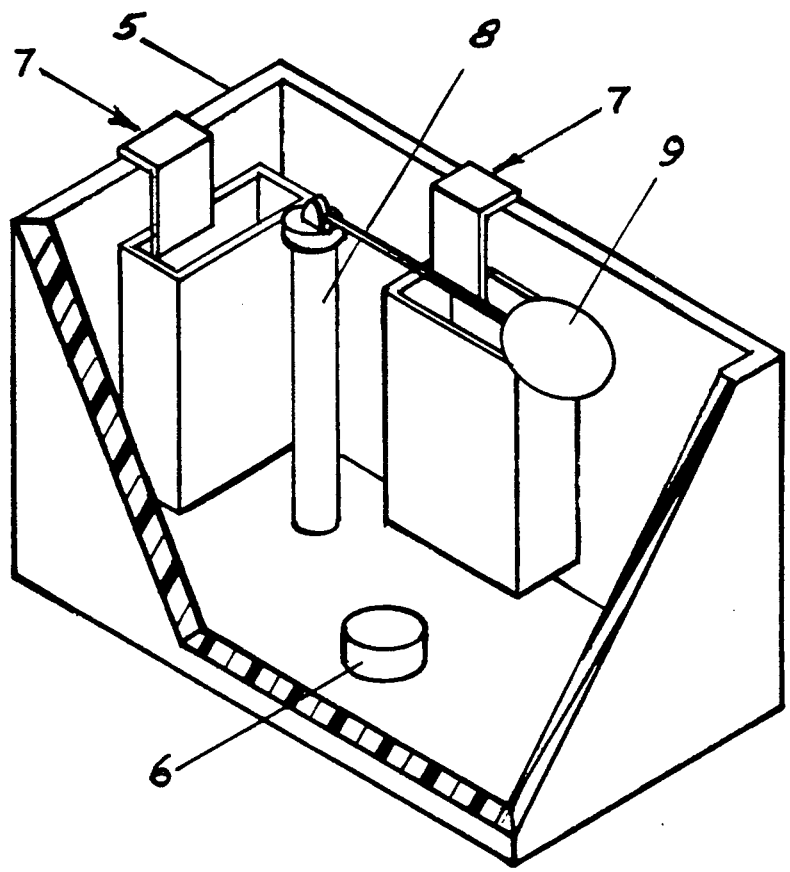
FIG. 1: Is a perspective of a typical water closet.

Referring to FIG. 1: Possible locations for the invention 7 have been identified in FIG. 1. In most conventional water closet tanks 5, these areas have little or no moving parts. When a water tank is discharged to flush the toilet, the water is released thru the discharge valve 6, after the valve is closed. The tank is refilled by the water inlet valve 8, which is controlled by the float valve 9.

Figure 2:
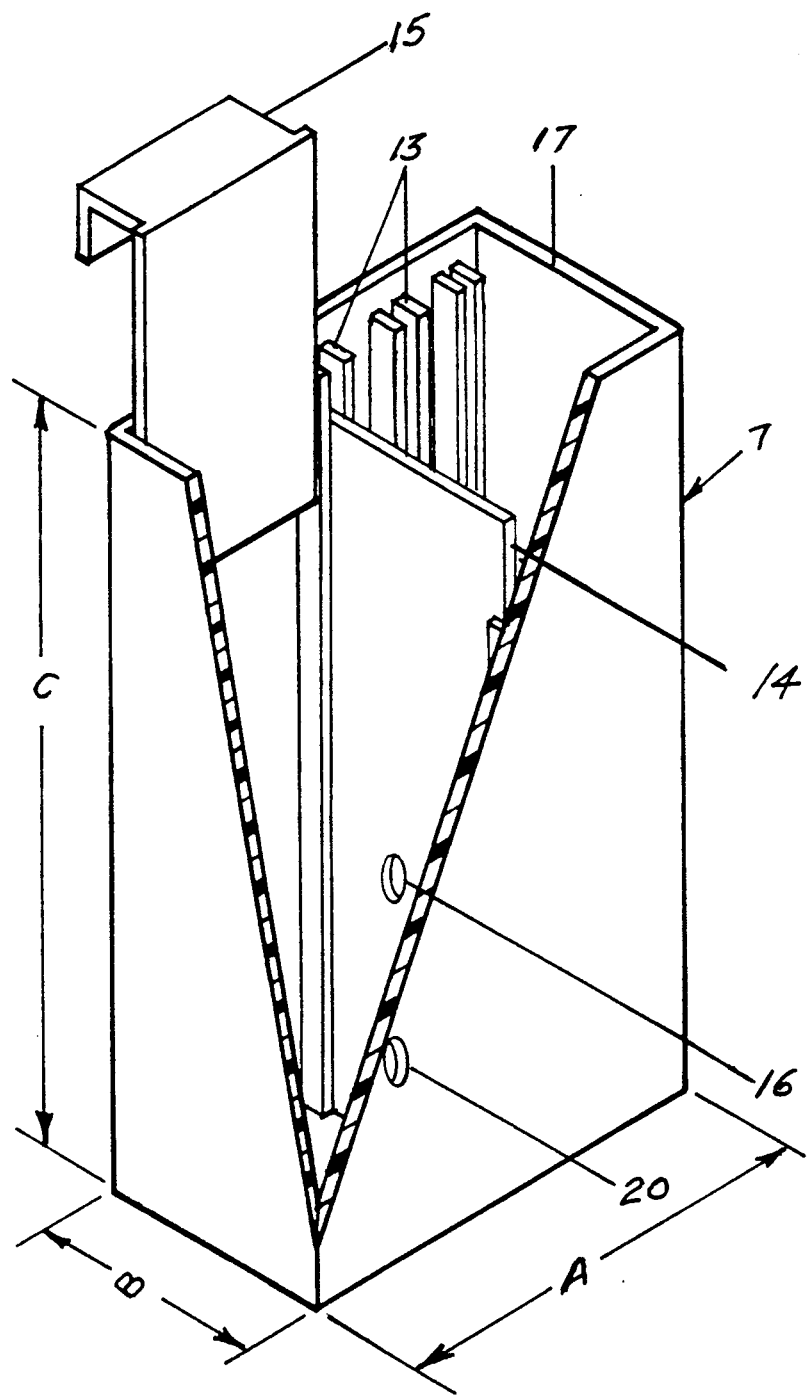
FIG. 2: A perspective of the internal components of the invention.

Referring to FIG. 2 The present invention has a volume of approximately 76 cubic inches. With outside dimensions of; width A, about four and one fourth inches, depth B, about two and one fourth inches and height C, about eight inches. This device is constructed with three sets of evenly spaced groves 13, the baffle 14 divides the device into two chambers.

The baffle 14 has a recirculating aperture 16 at the lower end, the aperture is about one hundred sixty thousandth of an inch in diameter and about two and three eights inch from the bottom. The invention is secured to the water tank by the hanger 15 which is where the water tank lid rests on and provides support. The hanger 15 also restricts the device's 7 side to side movement. This is accomplished by a close fit for the hanger 15 to inside of the casing 17 and the outside surface of grooves 13.

Figure 3:
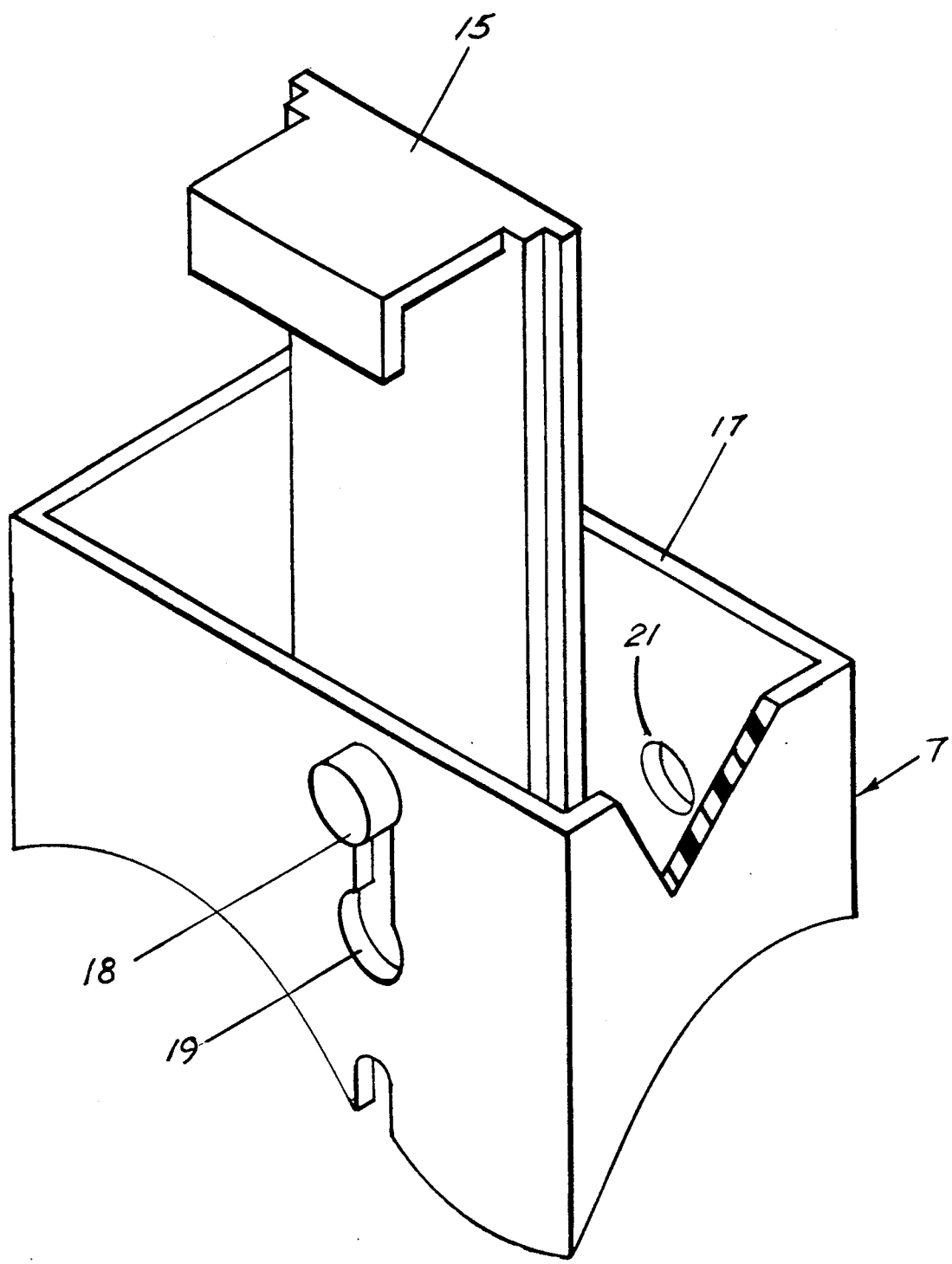
FIG. 3: Is a perspective of the hanger for securing the device to the tank.

Referring to FIG. 3. The device 7 is installed in the water tank with the water level just above the aperture 21. This adjustment is accomplished by putting the hanger's holding stud 18 into one of the slots 19. The holding stud is constructed with a flange larger than the slot 19 to restrict front and back movement. When the tank 5 is in its refilling cycle, the device will have a positive buoyancy for a short time. The slots 19 are designed to enable the casing 17 to move vertically until negative buoyancy returns the casing 17 to its resting position.

Figure 4:
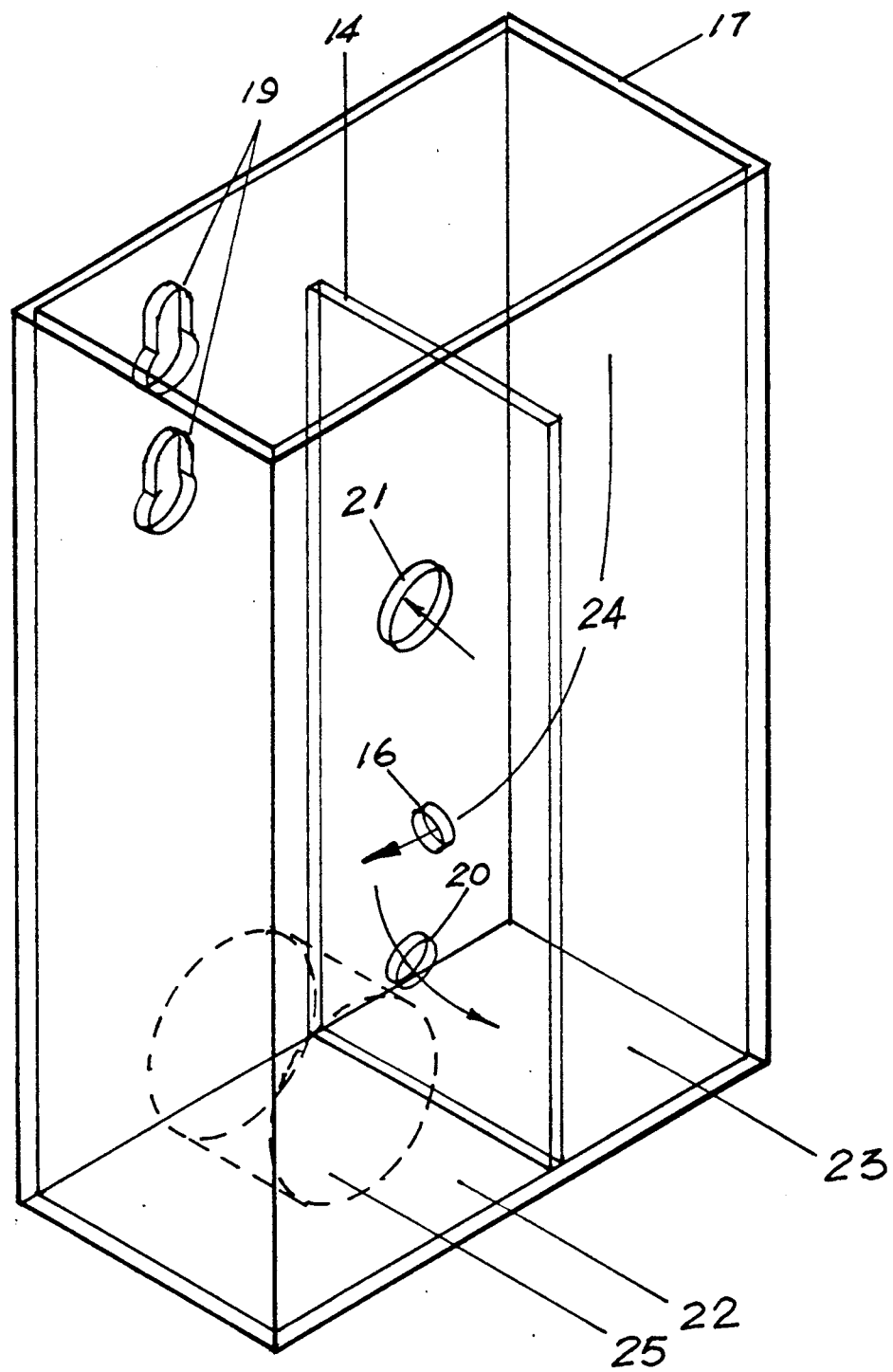
FIG. 4: Contemplates the water flow and how the device achieves its functions.

Referring to FIG. 4. When the device 7 is installed, the water from the water tank enters the device through three apertures and a slot: First, the discharge aperture 20 is located about three inches from the bottom and about an inch from the side, the size of the aperture is about two hundred thousandth of an inch in diameter, second, the water from the discharge chamber 22 to the holding chamber 23 through aperture 16, third, the discharge aperture 21, located about an inch from the side and about one and one half inch from the top, the size of the aperture is about one half inch in diameter, fourth, is the hanging slot 19 located in back of the device 7. The baffle 14 divides the casing 17 into two chambers 22 and 23. The discharge side 22 is where the solid cleaning agent 25 is placed. When a liquid cleaner of disinfectent is used, the liquid additive is placed into the holding chamber 23.

When the toilet is flushed, the invention will accomplish two objectives simultaneously: dispense a variable amount of solution into the water, and retain up to fourty-nine cubic inches of water with each flush.

First objective is to control the amount of solid cleaning additives dispensed. The common additive has a specific gravity higher than water, dissolving into the water by diffusion and will form a high surface tension when left undisturbed. In order to overcome these characteristics, the invention performs the following: Referring to FIG. 4, the cleaning agent 25 is placed in chamber 22, therefore it is isolated from all mechinisiams, in either solid or semi-dissolved form. The casing 17 is divided into two chambers, 22 and 23 by the baffle 14. By setting the baffle 14 into the first set of grooves 13 located at the center of main chamber the volume of discharge is at a minimum, When inserting the baffle 14 into the center set of grooves 13, the volume of discharge to chamber 22 is increased by approximately 33% and with the baffle 14 set into the last set of grooves 13 the discharge chamber 22 is increased 66% over the minimum setting. By the ability of varying the discharge chamber's 22 volume, the amount of solution discharged through aperture 21, is varied. It is obvious that more grooves will produce a finer variability. As the water level rapidly falls, the solution in the upper end of chamber 22 is quickly discharged through aperture 21 and slot 19, with the baffle 14 holding the solution in the holding chamber 23 to a slower discharge rate, with this difference in discharge rate of the two chambers, a pressure difference will create a solution flow between chambers 23 to 22 through aperture 16. This current 24 is at its strongest when the chambers reach equal volume. This current 24 is used to break the surface tension of additive 25, thus to allowing diffusion of the additive 25 into the water. The amount of additive dispensed is controlled by its diffusion rate, and the diffusion rate is controlled by the solution saturation point. Once the solution reaches the saturation point the diffusion ceases. With the casing 17 and the baffle 14 controlling the volume and baffle 14 controlling the flow 24, the saturation point in device 7 is quickly reached. Working in conjunction with apertures 16, 20 and 21 the baffle 14 controls the volume of release, therefore the amount of additive used can be varied.

Second objective is to retain water. As the device 7 is installed into the tank 5 it is filled with water. When the flush begins the water in the tank will quickly discharge thru valve 6, in about eight seconds valve 6 closes. In this time device 7 will discharge water from aperture 20, 21 and slot 19. The amount of water discharged during the flushing time is about twenty-eight cubic inches. Since the displacement of device 7 is approximately seventy-six cubic inches about forty-nine cubic inches is retained by device 7. By this retention, each flush of the toilet will use forty-nine cubic inches less water. Any discharge by device 7 after valve 6 closes is part of the refilling cycle.

The objective of a single device for adjusting the amount of solution used in each flush, reducing water consumption, and providing easy installation without adjustment or modification to a conventional water closet has been met and described. It is apparent to those knowledgeable in the art, that modifications are possible without departing from this invention's concepts. Therefore, this invention is not to be restrictive except for prior art and appended claims.

We claim:

1. In a toilet water closet containing water the level of which falls and rises during the flush cycle and using a water soluble cleaning agent, a variable quantity cleaning agent dispenser comprising:
   a fixed volume container having a plurality of exterior walls for holding said cleaning agent;
   a manually movable baffle for subdividing the volume of said container into at least a first subdivision containing said cleaning agent and a second subdivision of said container;
   means for retaining said baffle in said container in one of a plurality of preselected positions; and
   at least one aperture in an exterior wall of said first subdivision of said container and located in said water closet below the highest water level and above the lowest water level to allow flow of said cleaning agent into the water contained in said water closet when the level of water in said water closet falls below said aperture and to allow refilling of said first subdivision with water when the level of water in said water closet rises above said aperture;

whereby the positioning of said manually movable baffle determines the volume of said first subdivision and hereby the cleaning agent dispensed into said water closet during each flush cycle.

2. A variable quantity cleaning agent dispenser as recited in claim 1 wherein said baffle contains an aperture to allow flow of water from said second subdivision into said first subdivision during the flush cycle thereby preventing stagnation of the water contained in said second subdivision.

3. A variable quantity cleaning agent dispenser as recited in claim 1 wherein said baffle contains an aperture allowing flow of water from said second subdivision into said first subdivision during the flush cycle, the flow of which agitates the cleaning agent contained in said first subdivision thereby preventing stagnation of the water contained in said second subdivision and promoting the mixing of said cleaning agent with the water contained in said first subdivision.

4. A variable quantity cleaning agent dispenser as recited in claim 2 wherein said aperture in said baffle is positioned or sized to prevent the release of all water contained in said second subdivision during a flush cycle whereby total water consumed during the flush cycle is reduced by the amount of water retained in said second subdivision.

5. A variable quantity cleaning agent dispenser as recited in claim 1 wherein said cleaning agent is a water soluble tablet which dissolves in the water contained in said first subdivision until the water in said first subdivision is saturated with cleaning agent.

6. In a toilet water closet, a variable quantity cleaning agent dispenser comprising:
- a fixed volume container having multiple sides and a bottom and positioned in said water closet;
- a vertical, movable baffle located in said container and held in position by a pair of multiple sets of grooves positioned on the interior of said container and said baffle subdividing the volume of said container into at least a first subdivision containing a tablet of water soluble cleaning agent which over a period of time saturates the water contained in said first subdivision with cleaning agent and a second subdivision of said container;
- at least one aperture in said baffle to allow the flow of water from said second subdivision of said container to said first subdivision of said container;
- at least one aperture in a side or bottom of said first subdivision of said container to allow flow of said cleaning agent into the water contained in said water closet;
- whereby the volume of said first subdivision of said container and therefore the volume of saturated liquid dispensed by each flush cycle can be adjusted by positioning said baffle in one of a plurality of sets of grooves.

* * * * *